United States Patent [19]
Raven

[11] 3,802,433
[45] Apr. 9, 1974

[54] INFUSION CANNULA ASSEMBLIES
[76] Inventor: Carl Bertil Raven, Bengt Langhs Gata 1, S-252 33 Helsingborg, Sweden
[22] Filed: Aug. 30, 1972
[21] Appl. No.: 284,776

[30] Foreign Application Priority Data
Sept. 14, 1971 Sweden.............................. 11635/71

[52] U.S. Cl......... 128/214.4, 128/348, 128/DIG. 16
[51] Int. Cl............................................ A61m 05/00
[58] Field of Search .. 128/214.4, 221, 348, DIG. 16

[56] References Cited
UNITED STATES PATENTS
3,454,006  7/1969  Langdon........................... 128/214.4
2,828,744  4/1958  Hirsch et al. ....................... 128/221

FOREIGN PATENTS OR APPLICATIONS
1,934,287  1/1970  Germany............................ 128/221

Primary Examiner—Dalton L. Truluck

[57] ABSTRACT

An infusion cannula assembly has a mounting sleeve made from a thermoplastic material and having inside in the order mentioned a cylindrical mouth channel, a cylindrical mounting chamber with a diameter greater than that of the mouth channel, a connection chamber with a diameter greater than that of the mounting chamber, and an inwardly protruding snap collar, and an end section of a flexible cylindrical cannula tube, made from a polymer having a low friction coefficient extends through said mouth channel into said mounting chamber and is fastened to the mounting sleeve by being expanded into engagement with the circumferential wall of said mounting chamber by means of a tubular metal insert inserted in the cannula tube and having an outwardly directed end flange which abuts the cannula tube and is positioned between said snap collar and an annular shoulder at the merging point between said mounting chamber and said connection chamber, said end flange being movable past said snap collar with snapping action.

3 Claims, 2 Drawing Figures

PATENTED APR 9 1974 3,802,433
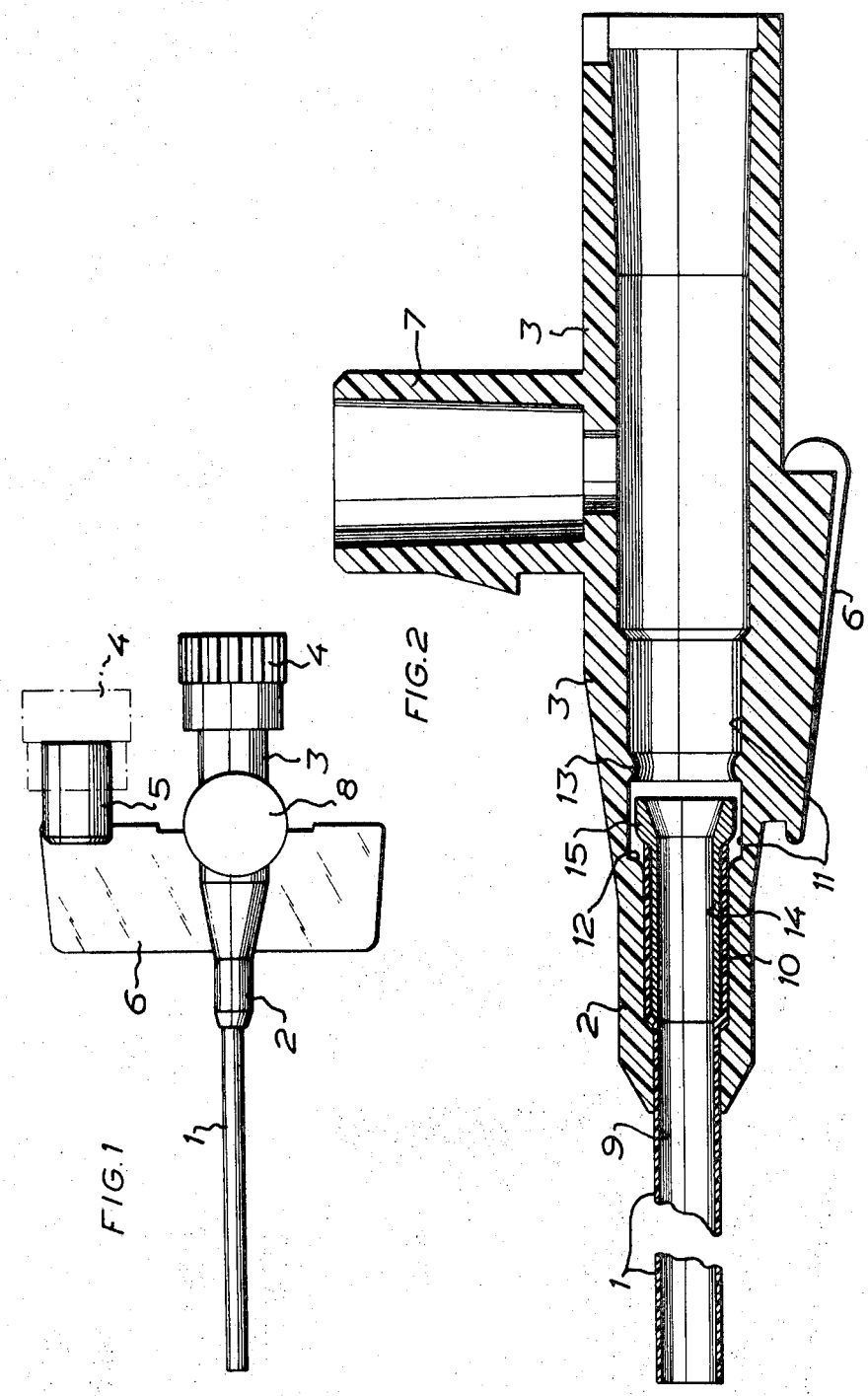

INFUSION CANNULA ASSEMBLIES

Infusion cannula assemblies are known, having a mounting sleeve made from a thermoplastic material, preferably polyethylene, and a flexible cylindrical cannula tube made from polytetrafluoroethylene or other plastic material having a low friction coefficient, one end section of said cannula tube being fastened in the mounting sleeve. In such assemblies it has proved very difficult and expensive to fasten the flexible cannula tube in the thermoplastic mounting sleeve in a reliable manner so that the tube cannot come loose from the sleeve and, if the worst comes to the worst, disappear into a patient's blood circulation system with disastrous consequences to the patient. The difficulties are due to the tube material, e.g., the polytetrafluoroethylene, having a very low friction coefficient with respect to other materials and being very difficult to wet. Conventional clamping or adhesive bonding cannot thus be employed. The best method hitherto known of fastening the cannula tube is described in Swedish printed application No. 336,036.

The method described in said printed application leads to an infusion cannula assembly of the type to which also the present invention relates, viz. an assembly having a connecting piece made from thermoplastic material, preferably polyethylene, and forming at one end a mounting sleeve, said assembly including a flexible cylindrical cannula tube which is made from polytetrafluoroethylene or other plastic material with a low friction coefficient and one end section of which is fastened in the mounting sleeve in that the sleeve, inside a cylindrical mouth channel of a diameter corresponding to the outer diameter of the tube, has a cylindrical mounting chamber whose diameter is greater than that of the mouth channel through which the tube passes into the mounting chamber where the tube is expanded into engagement with the cylindrical wall of said chamber throughout the axial length of said wall by means of a sleeve-shaped metal insert therein.

It has been found that the method of said printed application in practice must be carried out with great care to obtain a fully reliable anchoring. Thus, the sleeve-shaped metal insert must be so made that its length is accurately adjusted to the axial length of the mounting chamber, care must be taken that the metal insert is introduced into the cannula tube only so far that its outer end abuts the end of the cannula tube, and it has often been found difficult during mounting to upset the wall of the mounting chamber at the end remote from the mouth channel sufficiently radially inwardly to permit the bead formed to prevent the metal insert from sliding out of the cannula tube.

The present invention eliminates these practical difficulties in prior art cannula assemblies of the above-mentioned type by the cannula assembly being characterized in that the sleeve shaped metal insert has at one end an outwardly directed circumferential flange one side of which abuts the expanded end of the cannula tube and which is disposed in a cylindrical connection chamber which is provided in the connecting piece and has a diameter greater than that of the mounting chamber and merges therein with an annular shoulder and extends between said annular shoulder and a snap collar protruding inwardly from the wall of the connection chamber, the flange of said metal insert being movable past said snap collar with snapping action.

The invention will now be more fully described with reference to the accompanying drawing, in which:

FIG. 1 is a plan view of an infusion cannula assembly;

FIG. 2 is an enlarged axial section of the cannula assembly according to FIG. 1.

The infusion cannula assembly illustrated in the drawing is of a prior art type having a flexible cylindrical cannula tube 1 which is insertable into a vein of a patient and is made from polytetrafluoroethylene or other plastic material having a low friction coefficient. In the manner hereinafter described in more detail, one end section of the tube 1 is fastened in a mounting sleeve 2 whose end remote from the cannula tube 1 merges in a connecting piece 3 for a hypodermic syringe (not shown) or a hose connecting piece (not shown). The connecting piece 3 can be closed by means of a plug 4 which, when not in use (see the dash and dot lines), can be disposed in a holder on a base plate 6 which is integral with the connecting piece 3 and the mounting sleeve 2. The connecting piece 3 also has an upwardly directed connection socket for a hypodermic syringe or a hose connecting piece. When not in use, the socket 7 is closed by means of a cap 8. The details 2–8 are made from a thermoplastic material, preferably polyethylene.

The cannula tube is extruded so that it is cylindrical of constant cross-section from the outset. As will appear from FIG. 2, the mounting sleeve 2, inside a cylindrical mouth channel 9 of a diameter corresponding to the outer diameter of the tube 1, has a cylindrical mounting chamber 10 whose diameter is greater than that of the mouth channel. Provided in the connecting piece 3 is a cylindrical connection chamber 11 having a greater diameter than that of the mounting chamber 10 and merging therein with an annular shoulder 12. At a short distance from the annular shoulder 12 an annular snap collar 13 protrudes inwardly from the wall of the connection chamber 11.

The cannula tube 1 passes through the mouth channel 9 into the mounting chamber 10 and extends therefrom a little distance past the shoulder 12. That end section of the cannula tube 1 which is positioned within the mounting chamber 10 and, to a small extent, also in the connection chamber 11 is expanded by means of a sleeve-shaped insert 14 inserted in the tube, said insert being made from some suitable metal, preferably nickel silver, and having at one end an outwardly directed circumferential flange 15. The insert 14, 15 is introduced so far into the cannula tube 1 that one end of the cannula tube abuts one side of the flange 15. The insert 14 keeps the wall of the cannula tube 1 expanded into engagement with the wall of the mounting chamber 10 throughout the axial length of said wall. The flange 15 is disposed between the shoulder 12 and the snap collar 13. The outer diameter of the flange 15 is smaller than the inner diameter of the connection chamber 11 but slightly greater than the minimum diameter of the annular collar 13 so that the flange 15 can be forced past the snap collar 13 with snapping action.

For mounting the assembly, the insert 15 is first introduced into one end section of the cannula tube 1 until the tube end abuts one side of the flange 15. After that the cannula tube 1, with the insert 14, 15 in inserted position, is moved from the right with respect to FIG. 2 through the connecting piece and through the mounting sleeve 2 up to the position according to FIG. 2, and when passing the collar 13 the flange 15 of the insert displaces temporarily said collar radially outwardly. When the flange 15 has passed, the collar 13 snaps back to the position shown in FIG. 2 due to the elasticity of the metal of the connecting piece.

It is evident that the insert 14 will always have a fixed position in the cannula tube 1 because the insert is forced into the cannular tube until the flange 15 abuts the tube end. It also is evident that the axial length of the insert 14 may vary within certain limits without there being any risk that the end of the insert introduced into the cannula tube should not keep the wall of the cannula tube 1 expanded against the wall of the mounting chamber 10 as far as up to the transition between the cylindrical wall of the mounting chamber and the mouth channel 9, since it is not necessary that the flange 15 of the insert abuts the shoulder 12 or the snap collar 13 but it is sufficient that the flange 15 is positioned between the shoulder 12 and collar 13 with a normal clearance conditioned by manufacture. In this connection it should be noted that FIG. 2 is drawn approximately on the scale of 6:1 so that the clearance shown therein between the flange 15 and the shoulder 12 and collar 13 actually is not greater than what is conditioned by normal tolerances in the manufacture of the metal insert 14, 15. Although the snap collar 13 admits passage of the flange 15 when the assembly is mounted, the collar 13 efficiently prevents the metal insert 14, 15 from sliding out of the cannula tube 1 and the mounting chamber 10 when the assembly is in use.

What I claim and desire to secure by letters Patent is:

1. An infusion cannula assembly, comprising a connection piece made of thermoplastic material, a mounting sleeve integrally formed at one end of said connection piece, a flexible cylindrical cannula tube made of plastic material with a low friction coefficient, first wall means at one end of said mounting sleeve forming in said mounting sleeve a cylindrical mouth channel of a diameter corresponding to the outer diameter of said cannula tube, second wall means of said mounting sleeve forming a cylindrical mounting chamber in said mounting sleeve coaxial with and merging into the mouth channel formed by said first wall means, the mounting chamber formed by said second wall means having a diameter greater than that of the mouth channel, third wall means of said mounting sleeve forming a cylindrical connection chamber coaxial with and merging into the mounting chamber formed by said second wall means and having a diameter greater than that of the mounting chamber, an annular shoulder connecting said second and third wall means between the mounting chamber and the connection chamber, a snap collar protruding inwardly from said third wall means at an axial distance from said shoulder, one end of said cannula tube extending through the mouth channel into the mounting chamber, a tubular metal insert mounted in said end of said cannula tube and keeping said cannula tube end expanded into engagement with said second wall means throughout the axial length of said second wall means, and an outwardly directed circumferential flange integrally formed at one end of said insert and abutting said cannula tube end, said flange being disposed in the connection chamber between said shoulder and said snap collar and being movable past said snap collar with snapping action, said snap collar cooperating with said flange to restrain the metal insert from sliding out of the cannula tube.

2. An infusion cannula assembly according to claim 1 wherein said connection piece is made of polyethylene.

3. An infusion cannula assembly according to claim 1 wherein said cannula tube is made of polytetrafluoroethylene.

* * * * *